(No Model.)
W. F. WILKINS.
BELT FASTENER.
No. 271,010. Patented Jan. 23, 1883.
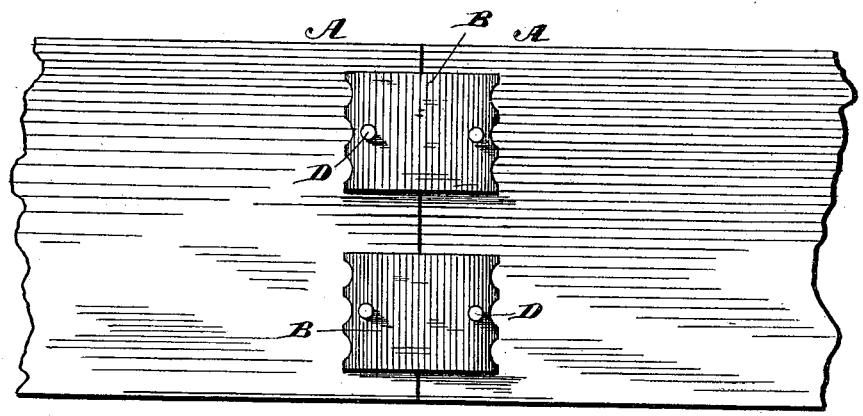
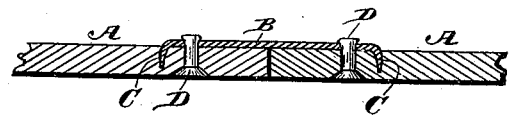
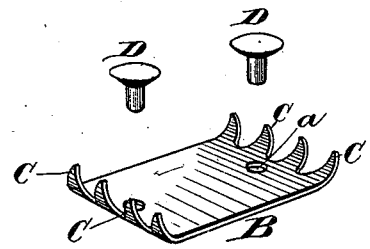
Witnesses.
Robert Everett.
M. S. Hyer
Inventor.
William F. Wilkins.
By Chas. B. Tilden
Atty.

UNITED STATES PATENT OFFICE.

WILLIAM F. WILKINS, OF ADAMSVILLE, QUEBEC, ASSIGNOR OF ONE-THIRD TO JOHN WILKINS, OF TORONTO, ONTARIO, CANADA.

BELT-FASTENER.

SPECIFICATION forming part of Letters Patent No. 271,010, dated January 23, 1883.

Application filed February 6, 1882. (No model.) Patented in Canada September 23, 1881, No. 13,463.

*To all whom it may concern:*

Be it known that I, WILLIAM F. WILKINS, a subject of the Queen of Great Britain, residing at Adamsville, in the Province of Quebec, Dominion of Canada, have invented certain new and useful Improvements in Belt-Fasteners, of which the following is a specification.

The object of my invention is to improve the metal-plate fasteners heretofore used, whereby a practicable, simple, and cheap fastening is provided, capable of being used repeatedly, of being attached with ease and rapidity and without injuring the belt, and of forming a strong and permanent fastening which cannot give way or be displaced by any strain or accident.

My invention consists in a metallic plate having toothed opposite edges and provided with a perforation formed in the body of the plate just behind each toothed edge, in combination with a fastening device having a flat head resting against the under surface of the belt and passing through the belt and the perforation in the plate, thereby drawing the teeth of the latter down into the material of which the belt is composed and holding them there.

Referring to the drawings, Figure 1 is a plan view showing two ends of a belt united by my invention. Fig. 2 is a perspective view of the fastening-plate detached, together with the devices for holding its toothed ends in engagement with the belt. Fig. 3 is a longitudinal section taken through the center of one of the plates in Fig. 1.

A A indicate the two ends of a belt brought together, and B indicates the metallic fastening-plate. This plate is made of metal, and has at each end serrations forming sharp teeth, C C, the serrated edges being bent at an angle to the body of the plate. Just in rear of the base-line of the teeth is formed a perforation, $a$, adapted to receive the end of a fastening device, D. It is provided at one end with a broad flat head, which is adapted to lie against the under surface of the belt and be flush therewith, while its stem or body is passed through a perforation in the belt and that in the plate. The teeth C having been driven into the leather, the end of the fastening device is upset or riveted down upon the plate B, as shown in Fig. 3. The teeth C should be of such length that they will not pass entirely through the leather. They should penetrate far enough to give a strong hold upon each end of the belt, and by placing the fastening device D just behind the line of teeth all possibility of their withdrawing or working loose is avoided.

In order to shorten the belt it is only necessary to cut off the end of one of the fastenings D and withdraw the teeth C. The end thus set free is cut shorter and the fastening reapplied, the entire operation being extremely simple.

The fastenings D require to be renewed frequently; but the plate B, which is formed of steel or brass, may be used any number of times or until it is wholly worn out.

I am aware that a fastening-plate formed in two parts and hinged together, with teeth at the ends, which were bent or hooked into perforations in the leather, has been patented. I am also aware that an improvement thereon has been patented, consisting in a plate having toothed ends, said teeth penetrating the leather but not clinched, and having a central vertical strip formed upon the under surface of the plate, against which the ends of the belt abut. I am also aware that Letters Patent have been granted for a single plate having teeth at the ends, which are clinched upon the inside of the belt. None of these devices are claimed by me. They have been tried and found wholly impractical. In the first and second, there being no means for holding the plate in engagement with the belt, except by the bite of the teeth in the leather, the plate is constantly becoming detached, and by the sagging or surging of a rapidly-driven belt it is frequently thrown off with great force. In the device last named, the teeth being driven through the belt and clinched, it is not possible to detach the plate without either cutting off the ends of the teeth or cutting them out of the belt, and in either case the plate cannot be used again, but must be thrown away. Moreover, by long use the clinched ends of the teeth are caused to cut through the leather, and sooner or later the fastening becomes detached. It will be seen that in shortening a slack belt the plate last named must be entirely detached and a new one substituted, thereby involving double the work and expense necessary with my device. Finally, it is evident that in all plate-fasteners made like that shown by Glover's Patent No. 210,518, running the solid, stiff plate over a pulley will almost instantly draw the teeth out of the belt, since the plate does not readily yield to the periphery of the pulley. In my invention the teeth which enter the leather are triangular in shape, widening rapidly from the apex toward the base, where they unite with the plate. By driving them into the leather up to said base and then applying a fastening directly behind the line of teeth they are wholly prevented from withdrawing, and the strain of the belt being distributed over the large area formed by the sum of their flat faces the fastening will sustain great stress without injury to the belt.

What I claim as my invention is—

The belt-fastener consisting of a plate, B, having its ends serrated to form teeth C, which are shorter than the thickness of the belt, said plate being provided with perforations $a\,a$, formed just in rear of the base-line of teeth C, in combination with fastening-pins D, having a broad flat head adapted to lie against the under surface of the belt, while the stem passes through the belt and perforation $a$, and is upset or riveted upon the upper surface of the plate, substantially as and for the purpose set forth.

In testimony whereof I have signed my name to this specification in the presence of two subscribing witnesses.

WM. F. WILKINS.

Witnesses:
W. J. GIBSON,
H. D. AMOUR.